(12) United States Patent
Gunawan (10) Patent No.: US 11,760,205 B2
(45) Date of Patent: Sep. 19, 2023

(54) MAGNETIC LEVITATION TRANSPORT WITH DIPOLE LINE TRACK SYSTEM

(71) Applicant: International Business Machines Corporation, Armonk, NY (US)

(72) Inventor: Oki Gunawan, Westwood, NJ (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 17/014,777

(22) Filed: Sep. 8, 2020

(65) Prior Publication Data

US 2020/0398678 A1 Dec. 24, 2020

Related U.S. Application Data

(62) Division of application No. 15/873,716, filed on Jan. 17, 2018, now Pat. No. 10,800,268.

(51) Int. Cl.
*B60L 13/04* (2006.01)
*H02K 7/09* (2006.01)
*H01F 7/02* (2006.01)

(52) U.S. Cl.
CPC ............ *B60L 13/04* (2013.01); *H01F 7/0247* (2013.01); *H02K 7/09* (2013.01)

(58) Field of Classification Search
CPC .......... B60L 13/04; H01F 7/0247; H02K 7/09
USPC ....................................................... 310/90.5
See application file for complete search history.

(56) References Cited

U.S. PATENT DOCUMENTS

| | | | |
|---|---|---|---|
| 3,664,268 A | 5/1972 | Lucas et al. | |
| 5,213,046 A | 5/1993 | Proise | |
| 5,270,593 A | 12/1993 | Levi et al. | |
| 5,375,531 A | 12/1994 | Ogihara et al. | |
| 5,671,058 A * | 9/1997 | Kawaguchi | G02B 26/10 310/90.5 |
| 6,361,268 B1 * | 3/2002 | Pelrine | H01L 21/67709 414/749.2 |
| 6,369,476 B1 * | 4/2002 | Sung | F16C 32/0438 310/90.5 |
| 6,483,222 B2 | 11/2002 | Pelrine et al. | |
| 6,510,799 B2 | 1/2003 | Lamb et al. | |
| 6,608,540 B1 | 8/2003 | Hones et al. | |

(Continued)

FOREIGN PATENT DOCUMENTS

| | | |
|---|---|---|
| CN | 103457439 A | 12/2013 |
| JP | S6464551 A | 3/1989 |

(Continued)

OTHER PUBLICATIONS

Gunawan et al. "A parallel dipole line system," Applied Physics Letters 106, 062407 (Feb. 2015) (5 pages).

(Continued)

*Primary Examiner* — John K Kim
(74) *Attorney, Agent, or Firm* — Caleb Wilkes; Michael J. Chang, LLC (57) ABSTRACT

Magnetic levitation transport using a parallel dipole line track system is provided. In one aspect, a magnetic levitation transport system includes: a dipole line track system having: i) multiple segments joined together, each of the multiple segments having at least two diametric magnets, and ii) at least one diamagnetic object levitating above the at least two diametric magnets. A method for operating a magnetic levitation transport system is also provided.

20 Claims, 8 Drawing Sheets

(56) References Cited

U.S. PATENT DOCUMENTS

| | | |
|---|---|---|
| 7,795,770 B1 | 9/2010 | Romero et al. |
| 7,859,157 B2 | 12/2010 | Baur |
| 8,169,114 B2 | 5/2012 | Simon |
| 8,895,355 B2 | 11/2014 | Cao et al. |
| 9,228,298 B2 | 1/2016 | Oster |
| 9,325,220 B2 | 4/2016 | Henderson et al. |
| 9,352,665 B2 | 5/2016 | Melvin et al. |
| 9,978,493 B2 | 5/2018 | Gunawan |
| 10,031,058 B2 | 7/2018 | Gunawan et al. |
| 10,082,408 B2 | 9/2018 | Gunawan |
| 10,128,013 B1* | 11/2018 | Gunawan ............... G21K 1/006 |
| 10,128,152 B2 | 11/2018 | Cao et al. |
| 10,199,247 B2 | 2/2019 | Tkachenko et al. |
| 10,308,135 B2 | 6/2019 | Henderson |
| 10,593,456 B2* | 3/2020 | Gunawan ............... B81B 3/0091 |
| 10,800,268 B2* | 10/2020 | Gunawan ............... B60L 13/04 |
| 2009/0160279 A1* | 6/2009 | Baur ....................... H02N 15/00 310/90.5 |
| 2011/0266109 A1 | 11/2011 | Meins et al. |
| 2014/0273450 A1* | 9/2014 | Cao ....................... H01F 7/0247 977/890 |
| 2017/0045433 A1 | 2/2017 | Gunawan et al. |
| 2017/0229330 A1* | 8/2017 | Tkachenko ............. H01L 21/82 |
| 2017/0299410 A1 | 10/2017 | Gunawan |
| 2018/0141459 A1* | 5/2018 | Henderson ............. B60L 13/04 |
| 2019/0217722 A1* | 7/2019 | Gunawan ................ H02K 7/09 |
| 2020/0398678 A1* | 12/2020 | Gunawan ............. B60L 15/005 |

FOREIGN PATENT DOCUMENTS

| | | |
|---|---|---|
| JP | 2010068603 A | 3/2010 |
| KR | 20160102761 A1 | 8/2016 |
| WO | WO2016128130 A1 | 8/2016 |

OTHER PUBLICATIONS

English Translation of CN103457439A by Xu Jianning Dec. 18, 2013 (5 pages).

English Translation of JP2010068603A by Mizutani Yasuhiro Mar. 25, 2010 (10 pages).

English Translation of KR20160102761A by Kang Ye Gu et al. Aug. 31, 2016 (35 pages).

English Translation of WO2016128130A1 by Noe Mathias et al. Aug. 18, 2016 (9 pages).

List of IBM Patents or Applications Treated as Related (2 pages).

Simon et al., "Diamagnetically stabilized magnet levitation," UCLA, Mar. 2001 (Year: 2001) (37 pages).

"Levitation Demo," Float Like a Butterfly (Year: 2016) (3 pages).

* cited by examiner

FIG. 1

Cross section

Side view
FIG. 7

MAGNETIC LEVITATION TRANSPORT WITH DIPOLE LINE TRACK SYSTEM

CROSS-REFERENCE TO RELATED APPLICATIONS

This application is a divisional of U.S. application Ser. No. 15/873,716 filed on Jan. 17, 2018, now U.S. Pat. No. 10,800,268, the contents of which are incorporated by reference herein.

FIELD OF THE INVENTION

The present invention relates to magnetic parallel dipole line (PDL) trap systems, and more particularly, to magnetic levitation transport using a PDL track system.

BACKGROUND OF THE INVENTION

With traditional forms of transportation, wheels are used that contact the ground or other surfaces such as rails. This contact causes friction which constitutes a significant energy loss. Friction also brings about accelerated wear to the various components.

As such, magnetic levitation transport systems are a favorable alternative as they provide transportation without any contact with the ground or other surface. Thus, energy loss due to friction is minimized as is noise and vibration, and overall energy efficiency of the system is improved.

However, existing magnetic levitation systems are complicated and expensive to create and implement. For instance, some approaches involve extensive electromagnetic systems and cryogenics to operate.

Thus, improved magnetic levitation transport systems would be desirable.

SUMMARY OF THE INVENTION

The present invention provides magnetic levitation transport using a parallel dipole line (PDL) track system. In one aspect of the invention, a magnetic levitation transport system is provided. The magnetic levitation transport system includes: a dipole line track system having: i) multiple segments joined together, each of the multiple segments having at least two diametric magnets, and ii) at least one diamagnetic object levitating above the at least two diametric magnets.

In another aspect of the invention, a method for operating a magnetic levitation transport system is provided. The method includes: providing a dipole line track system comprising: i) multiple segments joined together, each of the multiple segments having at least two diametric magnets, ii) at least one diamagnetic object levitating above the at least two diametric magnets, and iii) multiple capacitive plates beneath the dipole line track system; sensing the multiple capacitive plates with a capacitance meter to detect a presence of the diamagnetic object; and applying a voltage bias to each of the multiple capacitive plates in sequence to propel the diamagnetic object along the dipole line track system.

A more complete understanding of the present invention, as well as further features and advantages of the present invention, will be obtained by reference to the following detailed description and drawings.

DETAILED DESCRIPTION OF PREFERRED EMBODIMENTS

Provided herein are magnetic levitation transport systems that are based on a parallel dipole line track system. A parallel dipole line (PDL) trap system can be used to trap a diamagnetic cylindrical object. See, for example, Gunawan et al. "A parallel dipole line system," Applied Physics Letters 106, 062407 (February 2015) (5 pages) (hereinafter "Gunawan 2015"), the contents of which are incorporated by reference as if fully set forth herein. The trap consists of a magnetic parallel dipole line system made of a pair of transversely magnetized (or diametric) cylindrical dipole line magnets that naturally attract each other to a fixed position where both magnetization is aligned. Diametric magnets are magnets with magnetization perpendicular to their long axis. For example, in cylindrical diametric magnets the magnetization is along the diameter of the magnets. A diamagnetic cylindrical object such as a graphite rod can be trapped at the center. See, for example, Gunawan 2015, and U.S. Pat. No. 8,895,355 issued to Cao et al., entitled "Magnetic Trap for Cylindrical Diamagnetic Materials," the contents of which are incorporated by reference as if fully set forth herein.

Figure 1:
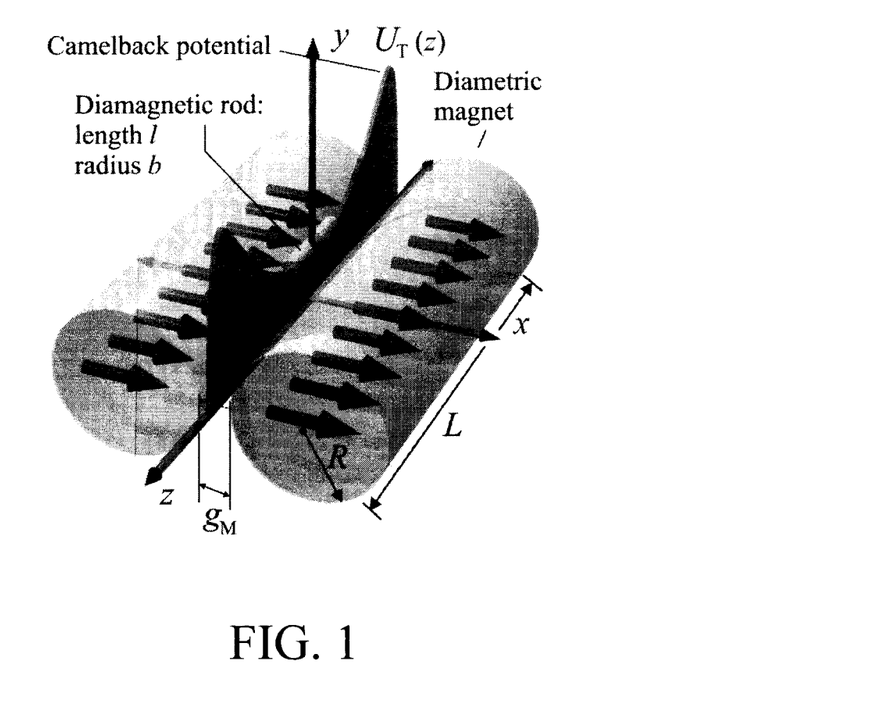
FIG. 1 is a diagram illustrating a parallel dipole line (PDL) trap system having a trapped diamagnetic object according to an embodiment of the present invention.

The key discovery and the central feature of the PDL trap is the existence of a "camelback magnetic potential" along the longitudinal (z-axis) which is derived from magnetic field enhancement near the edge of the dipole line. This occurs when the length of the dipole line or the magnet exceed certain critical length $L_C$, e.g., for a cylindrical diametric magnet this critical length is $L_C=2.5$ R where R is the radius of the magnet. See for example FIG. 1 which illustrates a PDL trap with cylindrical diametric magnets, trapped diamagnetic rod, and camelback potential.

Figure 2:
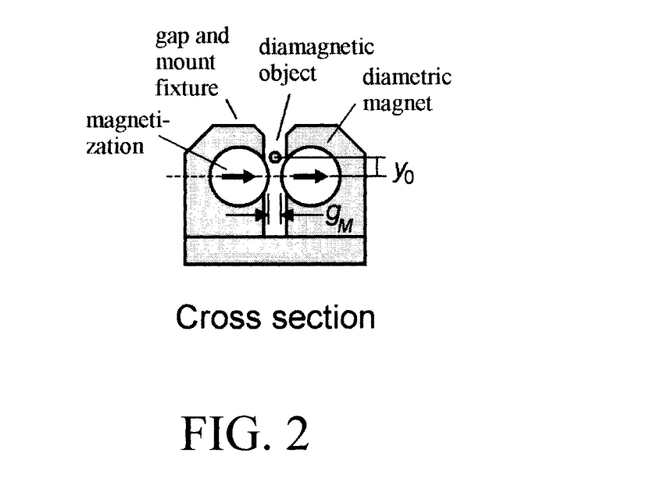
FIG. 2 is a cross-sectional diagram illustrating the PDL trap system with a variable gap $g_M$ set using a mount fixture according to an embodiment of the present invention.

A variable gap $g_M$ can be introduced in between the diametric magnets to tune the magnetic potential of the PDL trap. See, for example, the cross-sectional view of a PDL trap provided in FIG. 2. Specifically, varying the gap $g_M$ between the diametric magnets can serve to change a levitation height ($y_0$) of the trapped object, vary the magnetic field at the trapped rod, as well as open up space between the diametric magnets to fit more apparatus therebetween. See, for example, U.S. patent application Ser. No. 15/131,566 by Oki Gunawan, entitled "Parallel Dipole Line Trap with Variable Gap and Tunable Trap Potential" (hereinafter "U.S. patent application Ser. No. 15/131,566"), the contents of which are incorporated by reference as if fully set forth herein. By way of example only, the gap $g_M$ can be opened up between the diametric magnets using a fixed gap spacer or, as shown in FIG. 2, with a variable gap fixture (i.e., "gap and mount fixture"). For instance, as described in U.S. patent application Ser. No. 15/131,566, the variable gap fixture can include separate mounts affixed to each of the diametric magnets. The positioning of the mounts (attached to the diametric magnets) relative to one another can be changed, e.g., to move one side of the fixture (closer to or farther from the other side of the fixture) thus controlling the gap $g_M$. For instance, a screw(s) (not shown) can link one mount to the other, and by turning the screw the mounts are moved closer together or apart from one another. Once the correct gap $g_M$ is achieved, a set screw (not shown) can be used to lock in the positioning of the mounts.

Further, one or more electrodes located adjacent to the PDL trap can be used to control and sense the position of the trapped object in the trap. For instance, voltage biased (i.e., capacitive plate) electrodes above (or below—see FIG. 8, described below) the PDL trap can be used to yield a voltage-tunable one-dimensional (1D) potential for the trapped object. This technique is useful for manipulating (i.e., moving, accelerating) the trapped object within the trap, as well as for sensing the position of the trapped object in the PDL trap. See, for example, U.S. patent application Ser. No. 15/131,443 by Oki Gunawan, entitled "Voltage-Tunable 1D Electro-Magnet Potential and Probe System with Parallel Dipole Line Trap" (hereinafter "U.S. patent application Ser. No. 15/131,443"), the contents of which are incorporated by reference as if fully set forth herein. As described in U.S. patent application Ser. No. 15/131,443, the electrodes (in this case capacitive plates—see below) are positioned such that the diamagnetic rod can freely pass between the electrodes and the diametric magnets without touching either the electrodes or the magnets (i.e., when the diamagnetic rod is levitated above the diametric magnets). By applying a voltage bias to a given one of the electrodes and the diametric magnets, the position of the trapped diamagnetic rod can be controlled. Specifically, the voltage bias will perform some work as the trapped diamagnetic rod gets attracted to the center of the given electrode. Using this principle, if the electrodes/capacitive plates are placed in series along the PDL trap, then applying a voltage bias to each of the electrodes/capacitive plates in succession will actuate the trapped diamagnetic rod along the series of electrodes/capacitive plates.

According to an exemplary embodiment, a dipole line track system is provided that allows levitation and freedom of movement of the trapped diamagnetic rod along the dipole line track system. See, for example, FIGS. 3 and 4. A segment or section of the present dipole line track system is shown in FIG. 3 by way of a top-down view.

Figure 3:
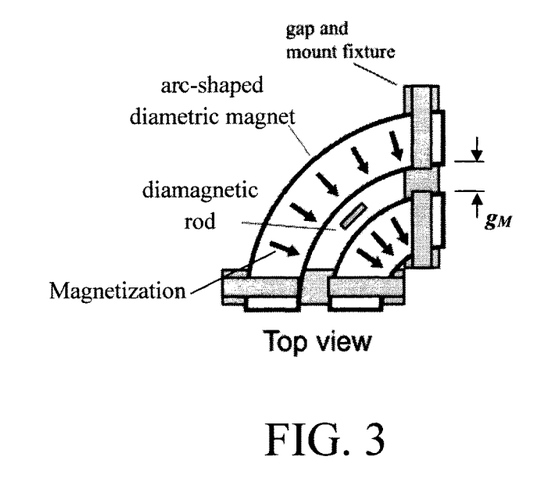
FIG. 3 is a top-view diagram illustrating a section of the present dipole line track system according to an embodiment of the present invention.

In the particular example shown in FIG. 3, the diametric magnets are curved (or arc-shaped) as opposed to other segments of the track that are straight. This enables more complex track configurations when multiple sections are joined together. See for example the oval track design shown in FIG. 4 (described below). The above-described variable gap and mount fixture is used to control a gap $g_M$ between the arc-shaped diametric magnets. As will be described in detail below, the trapped diamagnetic rod can be actuated along the dipole line track system, and when travelling along this section in particular, the trapped diamagnetic rod will follow the arc-shaped path of travel established by the diametric magnets.

As shown in FIG. 3, each dipole line segment includes at least two diametric magnets which can be straight or, in this case, curved or arc-shaped. The magnets themselves are each circular cross-section magnets (see, for example, FIG. 2—described above) with transverse magnetization (along their diameter) also called dipole line magnets. Each dipole line segment has a gap $g_M$ that allows the trapped object to carry maximum load and provide the maximum clearance.

Consider the diamagnetic rod of mass $m_0$ levitated in a PDL trap. Assuming that it carries a load with mass $m_L$ (and negligible magnetic susceptibility, i.e., $\chi \sim 0$), the maximum load mass that it can sustain is given as:

$$\frac{m_L}{m_0} = \frac{2.069}{\rho} \frac{\chi}{2+\chi} \frac{\mu_0}{g} \frac{M^2}{a} - 1 \qquad (1)$$

where a is half separation between magnet centers, i.e., $a=R+g_M/2$. For example, for a diametric magnet with $M=10^6$ A/m and graphite rod with $\chi=-2e-4$ and $\rho=1700$ kg/m³ we have $m_L/m_0=5.2$, thus a graphite rod can sustain the weight 5× its weight.

In general, the larger the diamagnetic rod used, the larger the load it can sustain. However, the size of the rod depends on the gap $g_M$ in between the diametric magnets that in turn depends on the levitation height $y_0$ and half magnet separation a. The maximum load that it can sustain is given as:

$$\Delta m_{L,MAX} = \left(-\frac{2.069}{\rho} \frac{\chi}{2+\chi} \frac{\mu_0}{g} \frac{M^2}{a} - 1\right) \rho \pi l b_{max}^2(y_0, a) \qquad (2)$$

Figure 11:
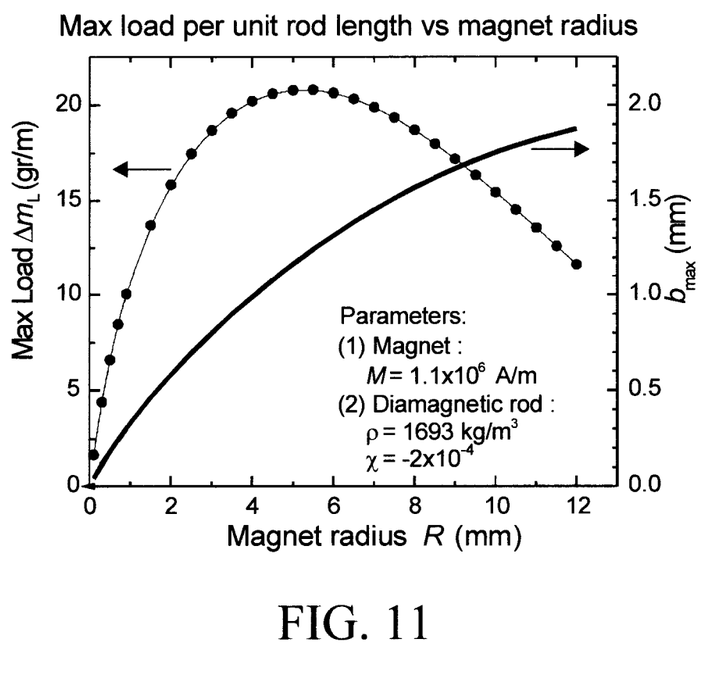
FIG. 11 is a diagram illustrating a maximum load mass per unit length versus magnet radius according to an embodiment of the present invention.

The maximum rod radius $b_{max}$ is given as:

$$b_{max} = \sqrt{y_0^2+a^2} - a \text{ and } y_0 = f(M,a,\chi,\rho) \qquad (3)$$

where $y_0$ is the levitation height which is a function of the magnet's M and R and the rod's $\chi$ and $\rho$ (see Gunawan 2015). For example, a plot of the maximum load mass per unit length versus magnet radius is provided in FIG. 11—described below.

Figure 4:
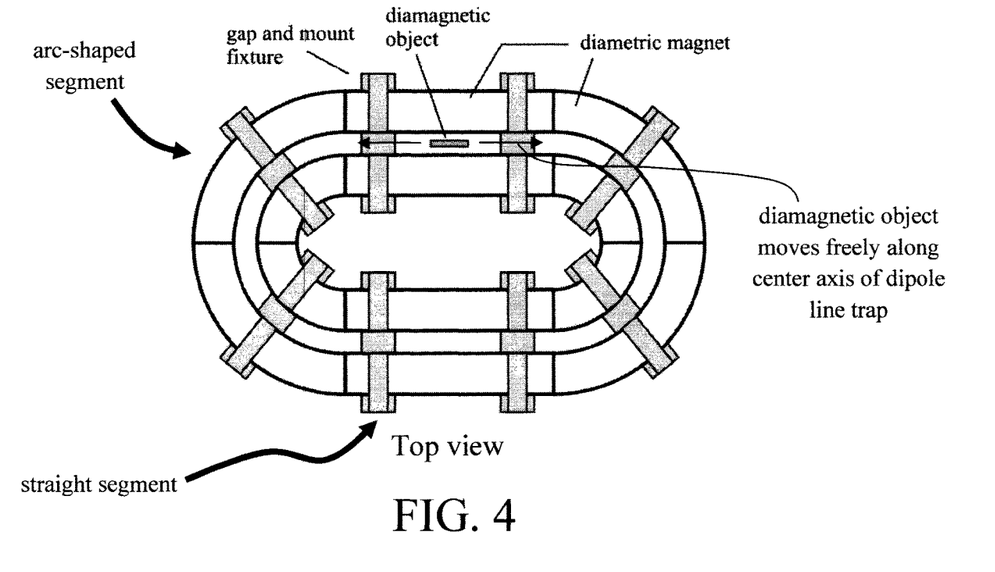
FIG. 4 is a top-view diagram illustrating multiple sections linked to form a particular configuration of the present dipole line track system according to an embodiment of the present invention.

FIG. 4 is a diagram illustrating how multiple (straight and arc-shaped) dipole line segments can be connected to form a particular track design. In this example, the track formed has an oval configuration. However, any track design formed using a combination of the above-described dipole line segments is anticipated herein. It is notable that the track design illustrated in FIG. 4 includes both straight and arc-shaped segments.

One important feature of the present parallel dipole line track system is that when the dipole line segments are joined together to form a track, the "camelback" potential humps (see FIG. 1) disappear thereby allowing the trapped object to move freely along the center axis of the dipole line trap. See FIG. 4.

Advantageously, the present system is simple, scalable, and requires no cryogenics. In fact, the only locomotive power input required to move the trapped object along the track system is to overcome the resistance of air friction. An exemplary system employing electrodes below the track system is described below, which can be used to propel the trapped object along the track.

Figure 5:
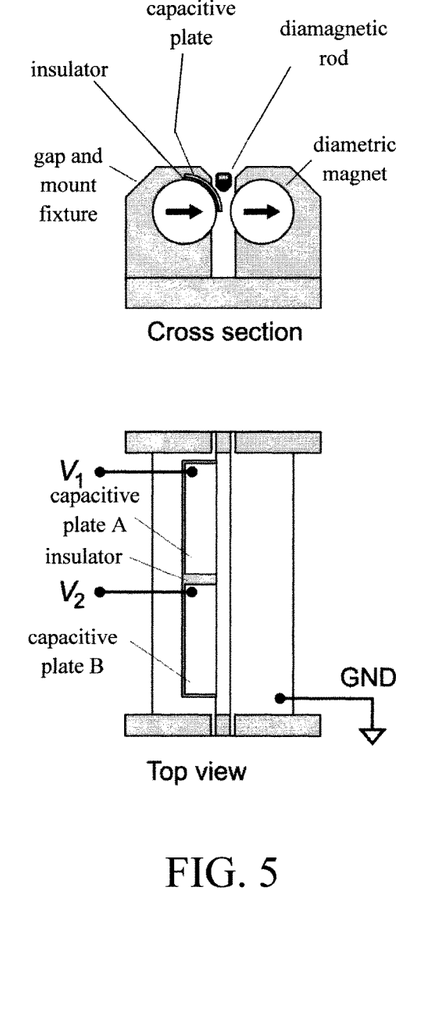
FIG. 5 is a cross-sectional diagram illustrating the present dipole line track system having two diametric magnets and a small-scale trapped diamagnetic object according to an embodiment of the present invention.
Figure 7:
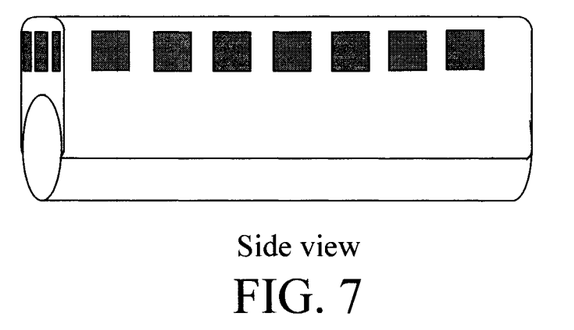
FIG. 7 is a side view diagram of a trapped diamagnetic object configured as a small-scale vehicle according to an embodiment of the present invention.

According to one exemplary embodiment, the dipole line track system includes a pair of, i.e., two diametric magnets which is suited to trap a small-scale diamagnetic object. For example, one can build the system using tracks with cylindrical diametric magnets each having a diameter of from about 1 millimeter (mm) to about 15 mm, and ranges therebetween. As shown in FIG. 5, the diamagnetic object can be configured to have an ornamental design, other than simply a rod shape. By way of example only, the diamagnetic object can be cast, carved, or otherwise shaped into a variety of different shapes as long as the shapes conform to the same aspect ratio as a rod, i.e., rod length l>>rod radius b. In the example shown in FIG. 5, the diamagnetic object is shaped as a small-scale vehicle that can be used as a scale model for testing levitated vehicle designs, for performing scientific experiments, and/or as an entertainment piece such as a model or toy. See also FIG. 7 which illustrates a side view of the diamagnetic object designed as a small-scale vehicle.

Figure 6:
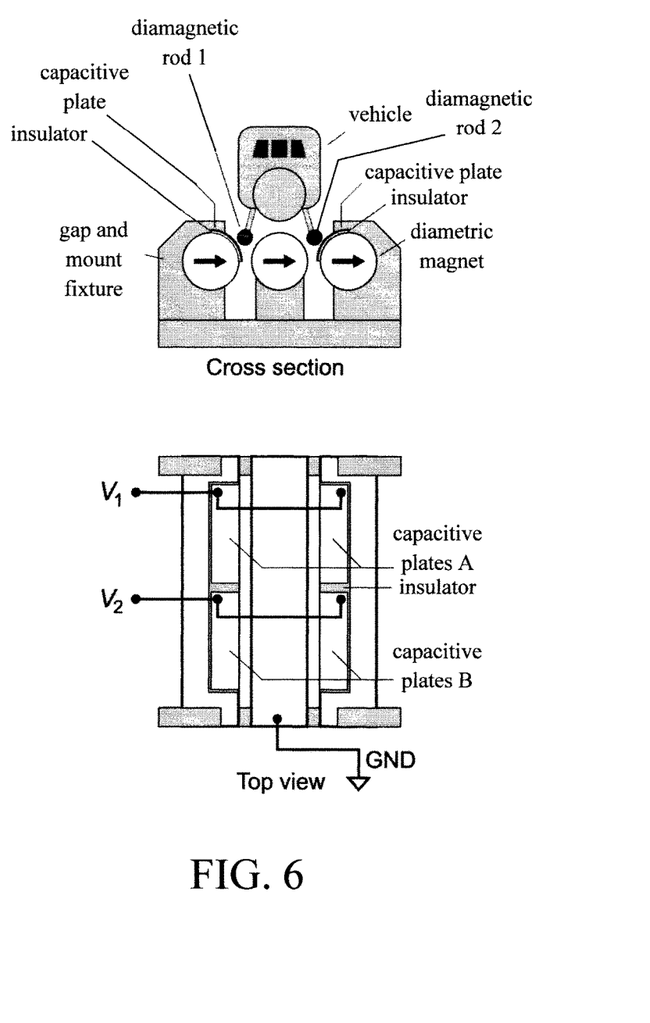
FIG. 6 is a cross-sectional diagram illustrating the present dipole line track system having more than two diametric magnets and a larger-scale trapped diamagnetic object according to an embodiment of the present invention.

In order to support larger design diamagnetic objects, the dipole line track system can include more than two diametric magnets. See, for example, FIG. 6. Again, using a vehicle design as an example, the vehicle itself is supported by multiple (in this case two) diamagnetic rods, each of which is trapped between a different pair of the diametric magnets. Specifically, as shown in FIG. 6 the track in this example includes three diametric magnets. The diametric magnets on the left and in the center trap a first diamagnetic rod (i.e., diamagnetic rod 1), while the dipole line magnets on the right and in the center trap a second diamagnetic rod (i.e., diamagnetic rod 2). Diamagnetic rod 1 and diamagnetic rod 2 both support the vehicle. Thus, by comparison with the embodiment illustrated in FIG. 5, the vehicle in FIG. 6 is supported by multiple diamagnetic rods and thus can be larger. For instance, the vehicle in FIG. 5 is generally confined to the dimensional requirements of the trapped diamagnetic object in order to assume a uniform magnetic field over the diamagnetic object, for example, a small radius b as compared to the half separation between the dipole lines a (i.e., b<a). See Gunawan 2015. On the other hand, in FIG. 6 the vehicle itself does not have to conform to this requirement since it is merely supported by the diamagnetic rods 1 and 2.

As another point of comparison, the vehicle in FIG. 5 is itself formed from a diamagnetic material, i.e., the diamagnetic object is shaped as the vehicle. On the other hand, while the rods 1 and 2 in FIG. 6 have to be diamagnetic, the vehicle itself does not, but it must not be too ferromagnetic as otherwise it will be attracted to the magnetic track. Thus, the vehicle in that case can be formed from one or more of a variety of different materials, such as plastic, wood, metal, etc.

Of course, the illustration of two parallel dipole line magnets (FIG. 5) and three parallel dipole line magnets (FIG. 6) is merely an example, and configurations are contemplated herein where, for example, more than three parallel dipole line magnets are employed in the track. For instance, four or five diametric magnets can be integrated into the design, thereby increasing the vehicle scale capacity.

As shown in FIG. 5 and FIG. 6 capacitive plates are present between the diamagnetic rod(s) and the diametric magnets. An insulator (e.g., plastic, rubber, etc.) is disposed between the capacitive plates and the diametric magnets. As will be described in detail below, a series of capacitive plates (i.e., capacitive plate A, capacitive plate B, etc.) is used to sense a position of the diamagnetic rod(s) and to propel the vehicle along the track. Embodiments are contemplated herein where a single series of capacitive plates is used to sense/propel the vehicle along the track. See for example FIG. 5. As shown in FIG. 5 the series of capacitive plates (i.e., capacitive plate A, capacitive plate B, etc.) and insulator are located in between the diamagnetic rod/vehicle and one of the diametric magnets (arbitrarily shown here to be the diametric magnet on the left side).

Embodiments are also contemplated herein where multiple series of capacitive plates are used to sense/propel the vehicle along the track. See for example FIG. 6. As shown in FIG. 6 two series of capacitive plates (i.e., capacitive plate A, capacitive plate B, etc.) and insulator are located in between the diamagnetic rod/vehicle and both of the outer diametric magnets.

As highlighted above, the only locomotive power input required to move the trapped object along the present track system is to overcome the resistance of air friction. According to an exemplary embodiment, one locomotion technique anticipated herein for the present system is using a capacitive drive system where segments of capacitive plates are installed below the track. See FIG. 8. The capacitive plates can be used to sense the presence of the diamagnetic rod using a capacitance meter C and/or can be energized with a voltage bias to pull the vehicle along the track. These voltage bias pulses can be coordinated using a switch unit which connects the multiple capacitive plates to a single voltage source Vs or capacitance meter C. See FIG. 8.

Figure 8:
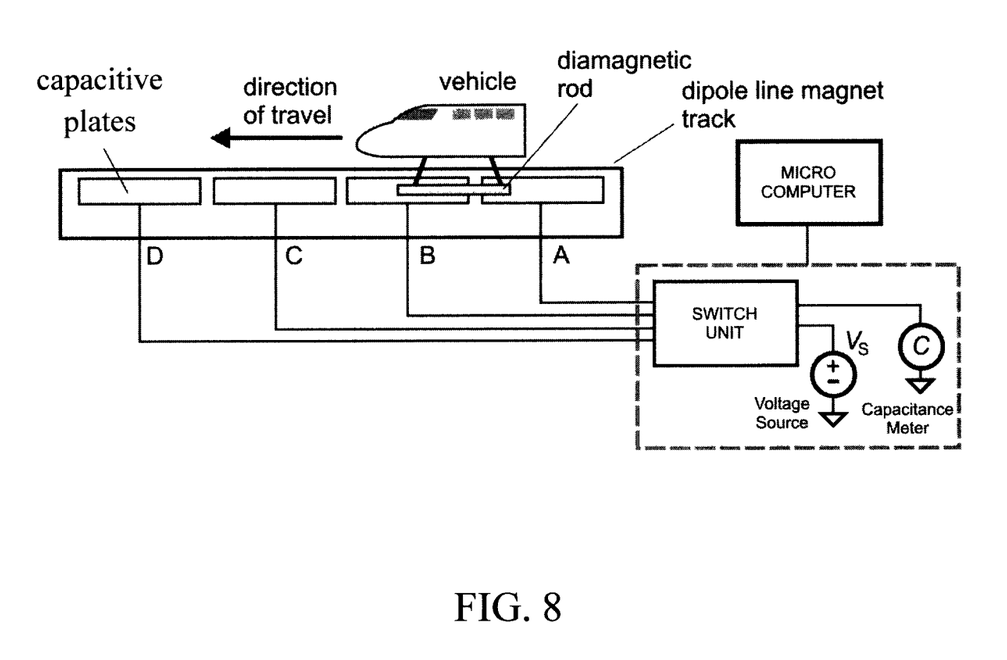
FIG. 8 is a diagram illustrating a capacitive drive system having segments of capacitive plates installed below the track according to an embodiment of the present invention.

As will be described in detail below, the sequence and/or frequency of the voltage bias pulses can control the direction of travel of the vehicle along the track and/or its speed. Thus, the sequence of voltage pulses metered out by the switch unit can be controlled via a microcomputer having processing capabilities for controlling propulsion of the vehicle.

During operation, the capacitance meter C is used to sense the diamagnetic rod. See, for example, exemplary methodology 900 of FIG. 9 which is now described in conjunction with the capacitive drive system of FIG. 8. For ease and clarity of description, the series of capacitive plates below the track are labeled A, B, C, D, etc. First, in step 902, the capacitive plate A operates in a 'sensing' mode by waiting to sense the incoming vehicle. Once the vehicle is detected by the capacitive plate A, in step 904, the capacitive plate B will be energized with a voltage bias to pull the vehicle towards the capacitive plate B. The system can also calculate the velocity of the vehicle by monitoring the rate of change in the capacitance detection A.

Figure 9:
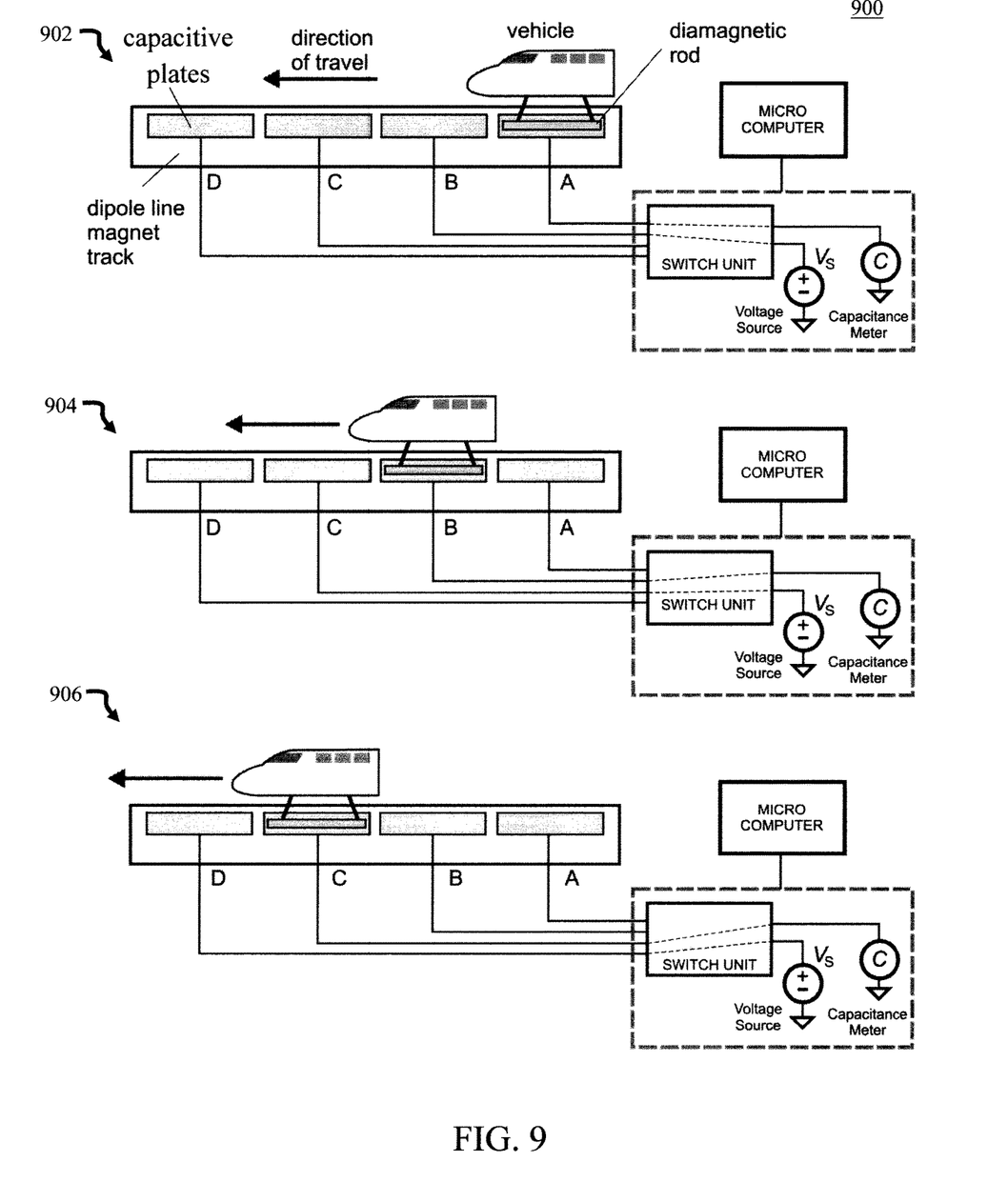
FIG. 9 is a diagram illustrating an exemplary methodology for operating the present dipole line track system using a capacitive sense and drive system to propel a vehicle along the track according to an embodiment of the present invention.

Once the vehicle has left capacitive plate A, the cycle repeats in sequence, whereby in step 906 the capacitive plate B is switched to a 'sensing' mode with the capacitance meter C and the capacitive plate C will be driven by a voltage bias to pull the vehicle towards it.

Figure 10:
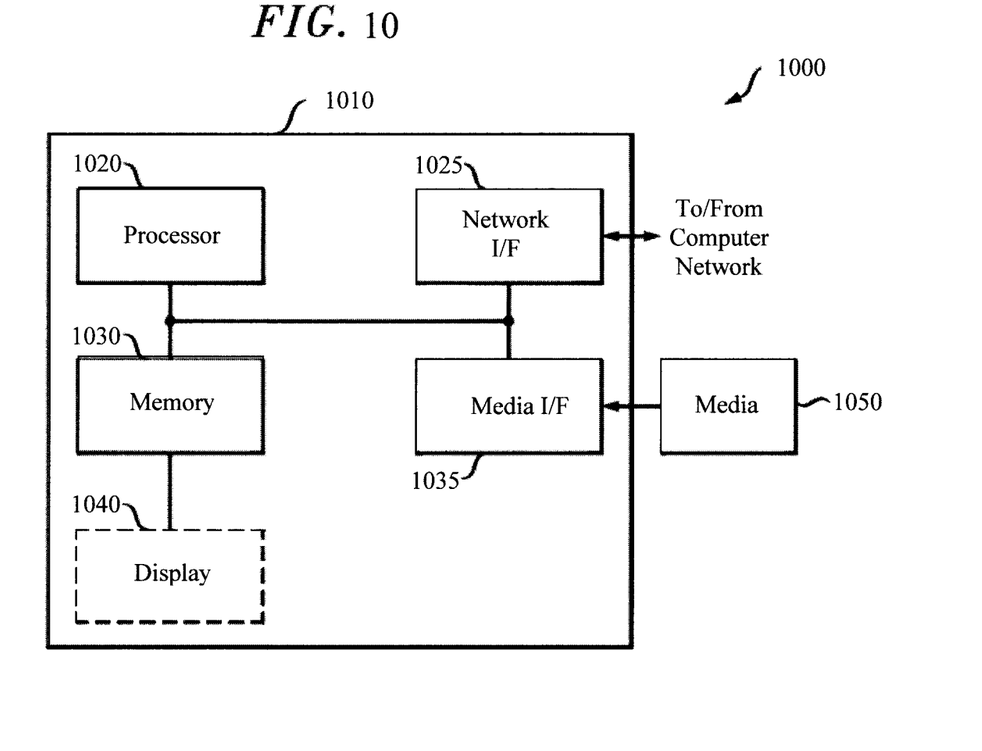
FIG. 10 is a diagram illustrating an exemplary apparatus that can be configured to serve as the microcomputer in the present dipole line track system according to an embodiment of the present invention.

As provided above, a microcomputer can be used to coordinate the switch unit and as such can be configured to perform the steps of methodology 900. A block diagram is shown in FIG. 10 of an apparatus 1000 that can be configured to serve as the microcomputer in the present system.

Apparatus 1000 includes a computer system 1010 and removable media 1050. Computer system 1010 includes a processor device 1020, a network interface 1025, a memory 1030, a media interface 1035 and an optional display 1040. Network interface 1025 allows computer system 1010 to connect to a network, while media interface 1035 allows computer system 1010 to interact with media, such as a hard drive or removable media 1050.

Processor device 1020 can be configured to implement the methods, steps, and functions disclosed herein. The memory 1030 could be distributed or local and the processor device 1020 could be distributed or singular. The memory 1030 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1020. With this definition, information on a network, accessible through network interface 1025, is still within memory 1030 because the processor device 1020 can retrieve the information from the network. It should be noted that each distributed processor that makes up processor device 1020 generally contains its own addressable memory space. It should also be noted that some or all of computer system 1010 can be incorporated into an application-specific or general-use integrated circuit.

Optional display 1040 is any type of display suitable for interacting with a human user of apparatus 1000. Generally, display 1040 is a computer monitor or other similar display.

FIG. 11 is a diagram illustrating a maximum load mass per unit length of the diamagnetic rod versus radius of the diametric magnet. As shown in FIG. 11, for a given set of system parameters such as magnet's magnetization M and the diamagnetic rod's magnetic susceptibility $\chi$ and mass density $\rho$ there is an optimum magnet radius R that will yield the maximum load that the system can sustain. Thus, this calculation will be important in designing the system.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for operating a magnetic levitation transport system, the method comprising the steps of:
    providing a dipole line track system comprising: i) multiple segments of diametric magnets joined together, end-to-end, with each of the multiple segments having at least two of the diametric magnets, and ii) at least one diamagnetic object levitating between the at least two diametric magnets; and
    propelling the at least one diamagnetic object along the multiple segments of the dipole line track system using a capacitive drive system that comprises at least one capacitive plate disposed between the at least one diamagnetic object and at least one of the diametric magnets.

2. The method of claim 1, wherein the dipole line track system further comprises: iii) multiple capacitive plates between the at least one diamagnetic object and the at least two diametric magnets, and wherein the method further comprises the step of:
    applying a voltage bias to each of the multiple capacitive plates in sequence to propel the at least one diamagnetic object along the dipole line track system.

3. The method of claim 2, wherein the dipole line track system further comprises: iv) a voltage source, and v) a switch unit between the multiple capacitive plates and the voltage source, and wherein the applying step further comprises the step of:
    using the switch unit to connect each of the multiple capacitive plates to the voltage source in sequence.

4. The method of claim 3, further comprising the step of:
    using the sequence in which the voltage bias is applied to each of the multiple capacitive plates to control a direction of travel of the at least one diamagnetic object along the dipole line track system.

5. The method of claim 3, further comprising the step of:
    using a frequency with which the voltage bias is applied to each of the multiple capacitive plates to control a speed of the at least one diamagnetic object along the dipole line track system.

6. The method of claim 3, further comprising the step of:
    sensing the multiple capacitive plates with a capacitance meter to detect a presence of the at least one diamagnetic object.

7. The method of claim 6, further comprising the steps of:
    sensing the presence of the at least one diamagnetic object with the capacitance meter and a first capacitive plate A along a direction of travel; and
    applying the voltage bias to a second capacitive plate B along the direction of travel to pull the at least one diamagnetic object toward the second capacitive plate B.

8. The method of claim 7, further comprising the step of:
    switching the second capacitive plate B to a sensing mode using the switch unit to connect the second capacitive plate B to the capacitance meter.

9. The method of claim 7, further comprising the step of:
    applying the voltage bias to a third capacitive plate C along the direction of travel to pull the at least one diamagnetic object toward the third capacitive plate C.

10. The method of claim 7, further comprising the step of:
    monitoring a rate of change in capacitance detected by the capacitance meter at the first capacitive plate A.

11. The method of claim 1, wherein the magnetic levitation transport system further comprises at least one vehicle levitating between the at least two diametric magnets, and wherein the at least one vehicle is the at least one diamagnetic object.

12. The method of claim 1, wherein the dipole line track system further comprises: at least one vehicle supported by the at least one diamagnetic object.

13. The method of claim 1, wherein each of the multiple segments has the at least two diametric magnets attached to a fixture, wherein the at least two diametric magnets are separated from one another by a gap $g_M$, and wherein the fixture comprises a variable gap fixture having separate mounts affixed to each of the at least two diametric magnets configured to vary the gap $g_M$ between the at least two diametric magnets.

14. The method of claim 1, wherein the at least two diametric magnets are circular cross-section magnets with transverse magnetization.

15. The method of claim 14, wherein the at least one diamagnetic object levitates above a center of each of the circular cross-section magnets.

16. The method of claim 1, wherein the at least two diametric magnets in at least one of the multiple segments are arc-shaped along their long axis.

17. The method of claim 1, wherein the at least two diametric magnets in at least one of the multiple segments are straight along their long axis.

18. A method for operating a magnetic levitation transport system, the method comprising the steps of:
    providing a dipole line track system comprising: i) multiple segments joined together, each of the multiple segments having at least two diametric magnets, ii) at least one diamagnetic object levitating between the at least two diametric magnets, and iii) multiple capacitive plates between the at least one diamagnetic object and the at least two diametric magnets with an insulator disposed between the multiple capacitive plates and the at least two diametric magnets; and
    applying a voltage bias to each of the multiple capacitive plates in sequence to propel the at least one diamagnetic object along the dipole line track system.

19. The method of claim 18, wherein the dipole line track system further comprises: iv) a voltage source, and v) a switch unit between the multiple capacitive plates and the voltage source, and wherein the applying step further comprises the step of:
    using the switch unit to connect each of the multiple capacitive plates to the voltage source in sequence.

20. The method of claim 18, further comprising the step of:
    sensing the multiple capacitive plates with a capacitance meter to detect a presence of the at least one diamagnetic object.

* * * * *